W. HOFFA.
AUTOMATIC WATER SUPPLYING APPARATUS.
APPLICATION FILED MAR. 27, 1916.
1,215,152.
Patented Feb. 6, 1917.
3 SHEETS—SHEET 1.
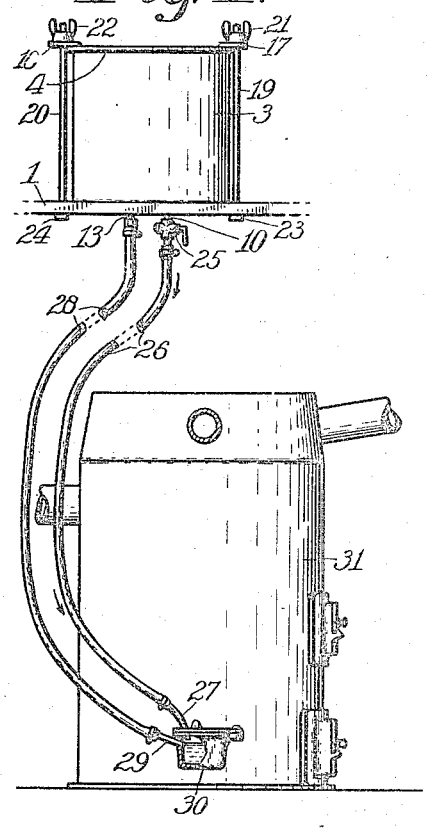
Fig. 1.
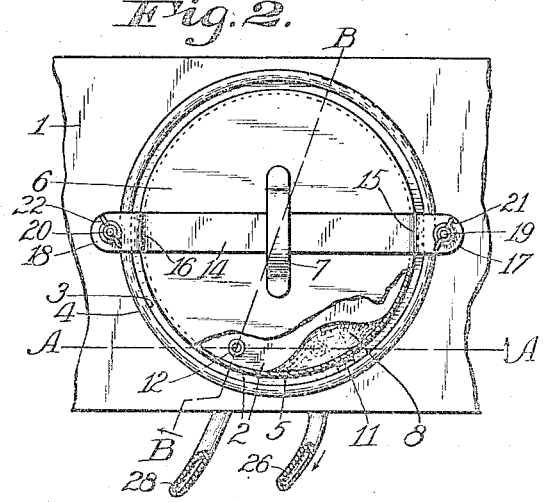
Fig. 2.
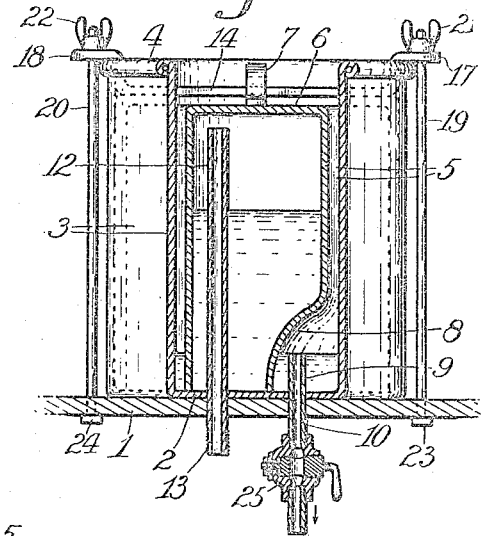
Fig. 3.
Fig. 4.
WITNESSES:
J. H. Gardner
M. E. Sparrow
INVENTOR:
William Hoffa,
BY
E. T. Silvius,
ATTORNEY.

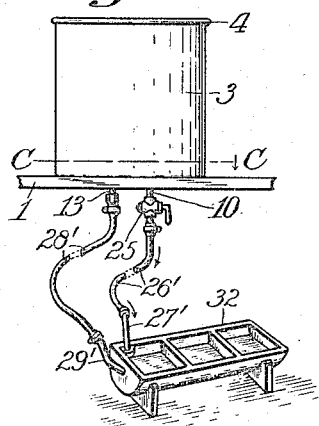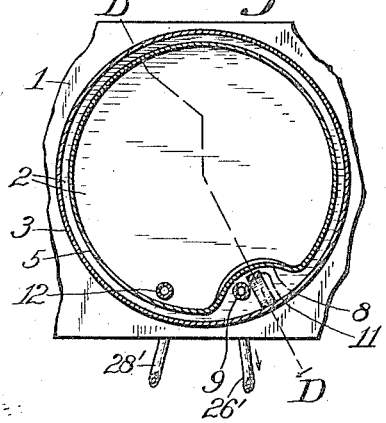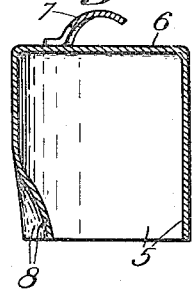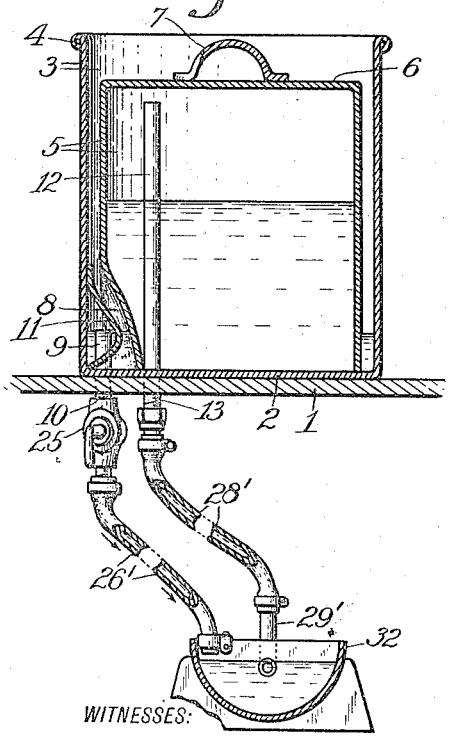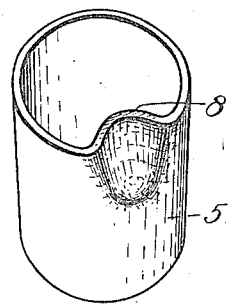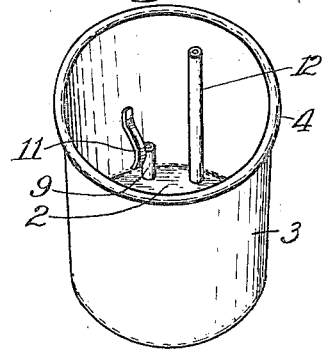

W. HOFFA.
AUTOMATIC WATER SUPPLYING APPARATUS.
APPLICATION FILED MAR. 27, 1916.
1,215,152.
Patented Feb. 6, 1917.
3 SHEETS—SHEET 3.
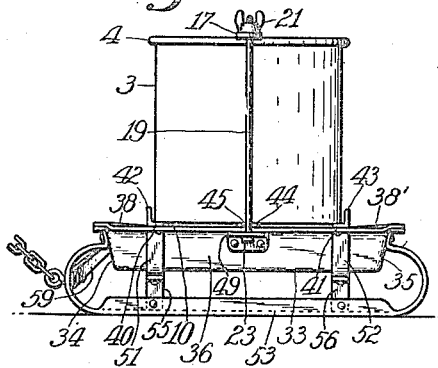
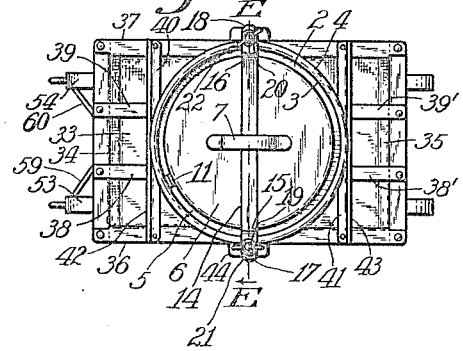
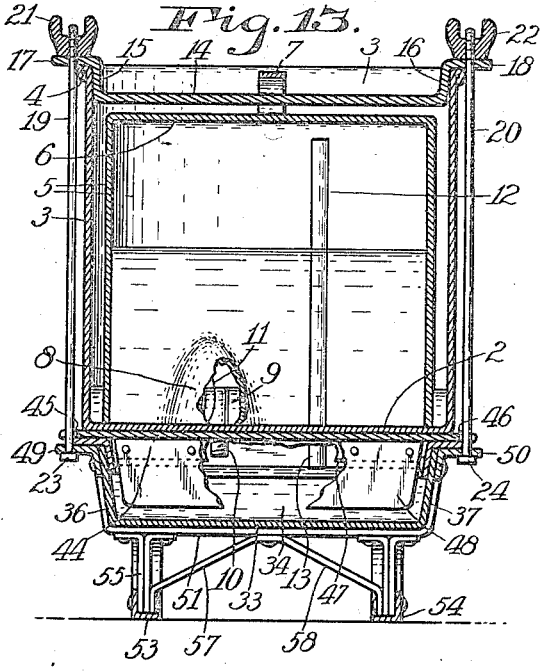
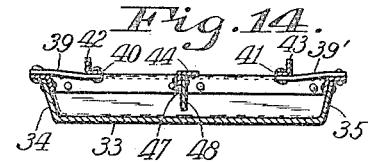
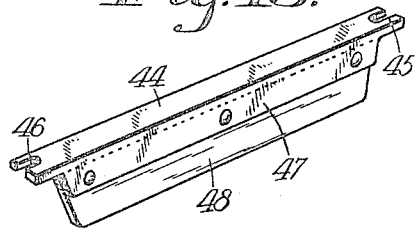
WITNESSES:
J. H. Gardner.
M. E. Sparrow.
INVENTOR:
William Hoffa,
BY
E. T. Silvius,
ATTORNEY.

UNITED STATES PATENT OFFICE.

WILLIAM HOFFA, OF CRAWFORDSVILLE, INDIANA.

AUTOMATIC WATER-SUPPLYING APPARATUS.

1,215,152. Specification of Letters Patent. Patented Feb. 6, 1917.

Application filed March 27, 1916. Serial No. 87,054.

*To all whom it may concern:*

Be it known that I, WILLIAM HOFFA, a citizen of the United States, residing at Crawfordsville, in the county of Montgomery and State of Indiana, have invented a new and useful Automatic Water-Supplying Apparatus, of which the following is a specification, reference being had to the accompanying drawings and to the letters and figures of reference marked thereon.

This invention relates to apparatus whereby water may be automatically supplied to a receptacle, such as an air-moistening water tank of a hot-air furnace or a drinking-trough for animals, whether stationary or portable, the invention having reference more particularly to water-supplying apparatus of the type that is designed to supply the receptacle as soon as the water is consumed or the level of the water lowered in the receptacle.

An object of the invention is to provide an improved water-supplying appliance that shall be so constructed as to be suitable for use to supply a portable drinking-trough when the atmospheric temperature is above the freezing point, and be adaptable to be housed when the temperature is below the freezing point and supply the water to a drinking-trough which may be exposed to freezing temperature. Another object is to provide means for automatically supplying water from a reservoir to the water tank of a hot-air furnace without requiring the attendant to carry water into the cellar where the furnace is usually located, or to frequently add small quantities of water to the water tank as evaporation exhausts the supply, an aim being to insure a constant supply of water for moistening the heated air to guard against the disadvantages arising through neglect of the attendant to replenish until after the water tank becomes empty. A further object is to provide cheaply constructed, efficient, durable and economical water-supplying apparatus that shall not be liable to become deranged or get out of order, and which may be readily set up for use in various ways as may be required.

With the above-mentioned and other objects in view, the invention consists in an improved water-supplying apparatus and also extensions thereof whereby the water may be delivered at a distance from the source of supply; the invention consisting further in the novel parts, and combinations and arrangements of parts, as hereinafter particularly described and further defined in the accompanying claims.

Referring to the drawings, Figure 1 is an elevation of the improved water-supplying apparatus and a hot-air furnace having a water tank with which the water-supplying apparatus is connected; Fig. 2 is a top plan of the water-supplying reservoir partially broken away; Fig. 3 is a vertical sectional elevation of the reservoir on the line A A on Fig. 2; Fig. 4 is a vertical section of the reservoir on the line B B on Fig. 2; Fig. 5 is an elevation of the water-supplying apparatus as applied to a drinking-trough; Fig. 6 is a section on the line C C on Fig. 5; Fig. 7 is a central section of one of the parts of the water-supplying apparatus; Fig. 8 is a vertical section of the water-supplying apparatus approximately on the line D D on Fig. 6 and connected with a drinking trough; Fig. 9 is a perspective view of the part shown in Fig. 7 but inverted; Fig. 10 is a perspective view of the reservoir comprising the main feature of the water-supplying apparatus; Fig. 11 is a side elevation of the water-supplying apparatus and a portable drinking-trough to be supplied thereby; Fig. 12 is a top plan of the water-supplying apparatus upon the drinking-trough; Fig. 13 is a transverse vertical section approximately on the line E E on Fig. 12; Fig. 14 is a longitudinal vertical central section of the drinking-trough minus its runners; and, Fig. 15 is a perspective view of a removable baffle-plate for preventing surging of the water in the portable drinking-trough.

Similar reference characters on the different figures of the drawings indicate corresponding elements or features of construction herein referred to.

In practically carrying out the objects of the invention a reservoir for holding an adequate quantity of water and feeding the water to a receptacle as required is provided and suitably supported. In case it is desired to place the reservoir at a distance from the receptacle, a suitable table or shelf 1 is provided which may be suitably supported in a convenient position so as to be at a greater elevation than the receptacle, and preferably is arranged in a building where the water would not be frozen in the reservoir. The reservoir consists of a bottom 2 and a cylindrical side wall 3 thereon having a bead 4 on its top portion, the reservoir being preferably composed of galvanized sheet metal. In order to control the feeding of the water from the reservoir a bell or vacuum-box is provided which consists of an imperforate cylindrical wall 5 adapted to rest upon the bottom 2 of the reservoir, and an imperforate top 6 fixed to the top of the wall 5, the top being provided on its top with a handle 7 whereby the bell may be conveniently lifted from the reservoir. Preferably the diameter of the bell is only slightly less than the internal diameter of the reservoir, so that a relatively small quantity of water can be retained in the reservoir externally to the bell; and in order to provide a supply-head from which to deliver the water a portion of the wall 5 of the bell is pressed inward and forms a concavity 8 in the wall adjacent to the bottom thereof. An outlet-pipe is inserted in the bottom 2 of the reservoir and secured thereto so as to form an upper portion 9 that extends a short distance upward into the concavity 8, and a portion 10 that extends downward through the supporting element 1. The portion 9 of the outlet-pipe causes a quantity of water to be retained in the reservoir to provide a water-seal for the bell. An inclined guide 11 is secured to the inside of the wall 3 and extends over adjacent to the top of the pipe portion 9 to guide the bottom portion of the bell when it is placed in the reservoir, to insure the placing of the concavity 8 over the pipe portion 9, so that the water shall be delivered from the reservoir directly from the space in the concavity outside the bell. An air-duct is provided for the bell which consists of a pipe that is inserted in and secured to the bottom 2 of the reservoir and has a long inner portion 12 that extends upward within the bell and nearly to the top 6, said portion having an open top, the pipe having a relatively shorter portion 13 that extends downward through the support 1 and to a slightly greater distance from the bottom 2 than the outlet-pipe portion 10.

In order to securely retain the reservoir in position on its support a clamp bar 14 is provided which is adapted to be passed through the handle 7 and extend horizontally above the bell within the upper portion of the reservoir, the clamp bar having upwardly-extending guide portions 15 and 16 to contact with the wall 3, the guide portions having ears 17 and 18 thereon that extend outwardly upon the top of the bead 4. Retaining rods 19 and 20 are provided which are inserted through the ears respectively and have thumb-nuts 21 and 22 thereon that engage the tops of the ears respectively, the retaining rods extending also through the support 1 and having heads 23 and 24 thereon respectively that engage the under side of the support. The attendant is thus prevented from carelessly dislodging the reservoir when re-filling it from a bucket. In case a receptacle is arranged immediately under the reservoir the end portion 13 of the air-duct is normally sealed by the water in the receptacle, while the end portion 10 of the outlet pipe is slightly above the level of the water in the receptacle so as to permit all of the water to drain out of the outlet-pipe, leaving none therein that might be frozen and prevent further delivery of water.

In case the receptacle to be supplied with water is at a considerable distance from the reservoir the outlet-pipe portion 10 preferably is provided with a stop-cock 25 to which a conduit 26 is connected, the latter being in some cases composed of a section of water-hose to the end of which a metallic pipe or nozzle 27 is connected. A conduit 28 which may be composed of a section of water-hose is connected to the end portion 13 of the air-duct and preferably has a metallic pipe 29 connected to its end. In some cases the pipe or nozzle 27 is secured to the upper portion of a water tank 30 of a furnace 31, the pipe 29 being connected to the water tank slightly lower than the end of the pipe or nozzle 27, as in Fig. 1. In some cases a conduit 26' is connected to the stop-cock 25 and provided with a pipe or nozzle 27', a conduit 28' being connected with the end portion 13 of the air-duct and provided with a pipe 29'. The pipe or nozzle 27' is secured in proper position to the upper portion of a drinking-trough 32, the pipe 29' being connected also to the trough slightly lower than the end of the pipe or nozzle 27', as shown in Fig. 5. In some cases the pipe or nozzle 27' may be omitted from the conduit 26' and the latter connected directly to the drinking-trough, as in Fig. 8.

In order that the full advantages of the simple and cheaply constructed water-feeding reservoir may be realized, the reservoir in some cases is mounted on a portable drinking-trough which is mainly composed of galvanized sheet metal and comprises a bottom 33 having ends 34 and 35 and sides 36 and 37 thereon suitably reinforced, the trough being relatively shallow, the ends and sides of which are inclined so as to not be injured in case the water in the trough becomes frozen. Division bars 38 and 39 are secured to the top of the front end 34, similar bars 38' and 39' being secured to the rear end 35 of the trough. Two beams 40 and 41 are secured to the tops of the sides 36 and 37 for supporting the reservoir, and they have guide flanges 42 and 43 respectively to prevent the reservoir from sliding from the beams. The bars 38 and 39 terminate under and are secured to the beam 40, the bars 38' and 39' terminating under and being secured to the beam 41. A center beam 44 is removably supported upon the tops of the sides 36 and 37 midway between the beams 40 and 41, and it has slots 45 and 46 in its opposite end portions that receive the retaining rods 19 and 20 respectively to prevent the beam from shifting when the trough is moved over the ground. The beam 44 has a downwardly extending flange 47 to which a baffle-plate 48 is secured and supported transversely in the trough so as to leave clearance space between the bottom and the sides thereof and the baffle-plate for the passage of water, the plate, however, preventing surging of the water when the trough is being moved over the ground. The sides 36 and 37 are provided with ears 49 and 50, respectively, through which the rods 19 and 20 respectively extend, the heads 23 and 24 of the rods engaging the under sides of the ears respectively. So arranged the retaining rods bind the reservoir securely to the center beam 44 and the latter to the top of the trough.

The bottom of the portable drinking-trough may in some cases be placed upon the ground, but preferably the trough is set in saddle members 51 and 52 and has runners 53 and 54 connected at their ends to the ends 34 and 35 of the trough, legs 55 and 56 being secured to the runners and to the saddle members. Lateral braces 57 and 58 are connected to the saddle members and also to the runners respectively, other braces 59 and 60 being connected to the forward portions of the runners respectively and to the forward end 34 of the trough to reinforce the runners at the points to which a draft animal may be hitched for drawing the apparatus over the ground.

In practical use water is poured into the reservoir or delivered thereto from a hose, the water flowing from the top 6 of the bell into the space surrounding the bell, passing thence under the bottom of the bell, the bell rising slightly as a float to permit the passage of water, and if it is desired to hasten the filling of the bell the latter may be lifted slightly by means of its handle. The water finally finds its level inside and outside of the bell, displacing the air which may have been trapped in the bell upon the water, the air passing out through the air-duct. Some of the water as the reservoir is being rapidly filled may be permitted to flow out through the outlet-pipe to flush the drinking-trough, or the stop-cock 25 may be closed or the outlet-pipe capped to retain the water outside the bell to be subsequently released as may be needed in the trough or in the water tank 30 of the furnace. After the stop-cock or the outlet-pipe has been left open to permit automatic action of the water-feeding apparatus the level of the water remaining in the reservoir outside the bell corresponds to the top of the outlet-pipe portion 9, as indicated particularly in Figs. 3, 4, 8 and 13. When some of the water in the tank of the heating furnace or in the drinking-trough evaporates or is consumed so that the level of the water is slightly lowered, the atmospheric air is permitted to enter the end of the pipe 29 or 29' and pass upward into the bell of the reservoir above the water therein, the action causing a slight pulsation that raises the bell slightly and permits a small quantity of water to pass under the bottom of the bell to the outside thereof and thence out through the outlet-pipe and into the water tank or drinking-trough, as the case may be, the out-flow being stopped when a partial vacuum is formed in the upper portion of the bell as the water in the receptacle rises and seals the orifice of the pipe 29 or 29'.

Having thus described the invention, what is claimed as new is—

1. Water-supplying apparatus including a reservoir having a flat bottom, an outlet-pipe extending through the bottom and secured thereto, a bell removably seated upon the bottom of the reservoir but not covering the outlet-pipe, and an air-duct extending through and secured to the bottom of the reservoir, the air-duct extending upward into the bell and nearly to the top thereof.

2. Water-supplying apparatus comprising a support, a reservoir seated upon the support, a bell removably seated upon the bottom of the reservoir, an outlet-pipe secured in the bottom of the reservoir and extending upward in the reservoir at the outer side of the bell, an air-duct secured in the bottom of the reservoir and extending upward in the bell, a clamp bar extending across the top of the bell and seated upon the top of the reservoir, and retaining rods connected to the support and the clamp bar.

3. Water-supplying apparatus including a reservoir comprising a bottom and a side wall, a bell in the reservoir, an outlet-pipe secured in the bottom of the reservoir and extending upward between the wall of the reservoir and the wall of the bell, and an air-duct having its terminal end in the bell adjacent to the top thereof, the inlet end of the air-duct being on a lower level than that of the terminal end of the outlet-pipe.

4. Water-supplying apparatus including a reservoir, a bell removably seated upon the bottom of the reservoir, an outlet-pipe secured in the bottom of the reservoir and extending upward between the bell and the side wall of the reservoir, an air-duct secured in the bottom of the reservoir and extending upward in the bell and nearly to the top thereof, a stop-cock connected to the lower end of the outlet-pipe, a conduit connected to the stop-cock, and a conduit connected to the lower end of the air-duct.

5. Water-supplying apparatus including a reservoir comprising a bottom and a side wall, a bell in the reservoir, the wall of the bell being removably seated upon the bottom of the reservoir and having a concavity in the lower outer side thereof, an outlet-pipe secured in the bottom of the reservoir and extending upward into the concavity, a guide secured to the inner side of the wall of the reservoir and extending downward at an inclination and adjacent to the top of the outlet-pipe, and an air-duct terminating in the upper portion of the bell.

6. Water-supplying apparatus including a reservoir comprising a flat bottom and a side wall, a bell in the reservoir, the side wall of the bell being removably seated upon the bottom of the reservoir and having a lower portion curved inward to form a concavity opposite the side wall of the reservoir, an outlet-pipe secured in the bottom of the reservoir and extending upward into the concavity, and an air-duct secured in the bottom of the reservoir and extending upward into the bell and nearly to the top thereof.

7. Water-supplying apparatus including a reservoir having a bottom and a side wall, the wall having an inclined guide on the lower portion of the inner side thereof, a bell in the reservoir, the side wall of the bell being removably seated upon the bottom of the reservoir and having a concavity in the outer side of the lower portion thereof receiving the guide, the top of the bell having a handle thereon, an outlet pipe secured in the bottom of the reservoir and extending upward into the concavity and adjacent to the inclined guide, and an air-duct secured in the bottom of the reservoir and extending upward in the bell and nearly to the top thereof and also extending below the bottom farther than the outlet-pipe.

In testimony whereof, I affix my signature in presence of two witnesses.

WILLIAM HOFFA.

Witnesses:
J. NEWTON FULLENWIDER,
WESLEY A. FULLENWIDER.

Copies of this patent may be obtained for five cents each, by addressing the "Commissioner of Patents, Washington, D. C."